United States Patent
Son et al.

(10) Patent No.: US 8,761,714 B2
(45) Date of Patent: Jun. 24, 2014

(54) SYSTEM AND METHOD FOR PROVIDING AN EMERGENCY SERVICE IN A COMMUNICATION SYSTEM

(75) Inventors: Yeong-Moon Son, Yongin-si (KR); Jung-Hoon Cheon, Suwon-si (KR); Chan-Ho Min, Yongin-si (KR); Hyun-Jeong Kang, Seoul (KP); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1367 days.

(21) Appl. No.: 12/356,947

(22) Filed: Jan. 21, 2009

(65) Prior Publication Data

US 2009/0186595 A1 Jul. 23, 2009

(30) Foreign Application Priority Data

Jan. 17, 2008 (KR) .................. 10-2008-0005451

(51) Int. Cl.
*H04M 11/04* (2006.01)
(52) U.S. Cl.
USPC .............. 455/404.1; 455/574; 455/127.5
(58) Field of Classification Search
CPC ....... H04W 4/22; H04W 52/00; H04W 52/02; H04W 68/02
USPC ................. 455/404.1, 127.5, 343.1
See application file for complete search history.

(56) References Cited

U.S. PATENT DOCUMENTS

| | | | |
|---|---|---|---|
| 2005/0128990 A1 | 6/2005 | Eom et al. | |
| 2006/0140391 A1* | 6/2006 | Bizjak et al. | 379/373.01 |
| 2007/0087767 A1* | 4/2007 | Pareek et al. | 455/502 |
| 2007/0168577 A1* | 7/2007 | Kim et al. | 710/15 |
| 2008/0125885 A1* | 5/2008 | McNutt et al. | 700/81 |
| 2008/0159427 A1* | 7/2008 | Kang et al. | 375/260 |
| 2010/0110956 A1* | 5/2010 | Hepworth et al. | 370/312 |

FOREIGN PATENT DOCUMENTS

KR 10-0943582 B1 2/2010

OTHER PUBLICATIONS

IEEE Std 802.16e™-2005 and IEEE Std 802.16™-2004/Cor1-2005, "Part 16 Air Interface for Fixed and Mobile Broadband Wireless Access Systems, Amendment 2 Physical and Medium Access Control Layers for Combined Fixed and Mobile Operation in Licensed Bands and Corrigendum 1", Feb. 28, 2006.

* cited by examiner

*Primary Examiner* — Olumide T Ajibade Akonai
*Assistant Examiner* — Shantell L Heiber
(74) *Attorney, Agent, or Firm* — Jefferson IP Law, LLP (57) ABSTRACT

A system and method for providing an emergency service in a communication system is provided. A method for providing an emergency service by an idle mode Mobile Station (MS) in a communication system includes receiving, from a Base Station (BS), a broadcast message including information on a time duration in which an emergency service message will be transmitted after waking up at a start timing point of a paging listening interval, transitioning into an idle state when a start timing point of the time duration in which the emergency service message will be transmitted is later than a timing point at which the paging listening interval is terminated, and waking up at the start timing point of the time duration in which the emergency service message will be transmitted after transitioning into the idle state.

28 Claims, 8 Drawing Sheets

FIG.1

| Name | Type | Length | Value |
|---|---|---|---|
| Emergency Service message Container | XX | Variable | Emergency Service Message is included |

FIG.2

| Syntax | Size | Notes |
|---|---|---|
| MOB_PAG-ADV_Message_Format() { | | |
| Management Message Type = 62 | 8 bits | |
| Num_Paging_Group_Ids | 8 bits | |
| Emergency Service Message Indication | 1 bit | |
| Reserved | 3 bit | |
| For (i=0; i<Num_Paging_Group_IDs; i++) { | | |
| Paging Group ID | 16 bit | |
| } | | |
| Num_MACs | 8 bit | |
| For (j=0; j<Num_MACs; j++) { | | |
| MS MAC Address hash | 24 bit | |
| Action Code | 2 bit | Paging action instruction to MS<br>0b00=No Action Required<br>0b01=Perform Ranging to establish location and acknowledge message<br>0b10=Enter Network<br>0b11=Reserved |
| Reserved | 6 bit | |
| } | | |
| Padding | | |
| TLV Encoded Information | | |
| } | | |

SYSTEM AND METHOD FOR PROVIDING AN EMERGENCY SERVICE IN A COMMUNICATION SYSTEM

PRIORITY

This application claims the benefit under 35 U.S.C. §119(a) of a Korean patent application filed in the Korean Intellectual Property Office on Jan. 17, 2008 and assigned Serial No. 10-2008-0005451, the entire disclosure of which is hereby incorporated by reference.

BACKGROUND OF THE INVENTION

1. Field of the Invention

The present invention relates to a system and method for providing a service in a communication system. More particularly, the present invention relates to a system and method for providing an emergency service in a communication system.

2. Description of the Related Art

A next-generation communication system is being developed to provide various high-speed, high-capacity services to Mobile Stations (MSs). Examples of the next-generation communication system include an Institute of Electrical and Electronics Engineers (IEEE) 802.16 communication system and a Mobile Worldwide Interoperability for Microwave Access (WiMAX) communication system. Here, the Mobile WiMAX communication system is based on the IEEE 802.16 communication system, and the IEEE 802.16 communication system is based on an IEEE 802.16 standard.

Next, an emergency service proposed for a conventional IEEE 802.16 communication system will be described.

Generally, an emergency service includes a Wireless Emergency Rescue Service (WERS) and a Wireless Emergency Alert Service (WEAS). Each of the WERS and the WEAS will be described.

The WERS is referred to as an MS-triggered Emergency Service (MS-triggered ES), and includes a rescue service that determines a location of an MS in an emergency situation, for example, a fire, a crime, etc. The WERS is generally triggered by an MS, which is the reason why the WERS is referred to as the MS-triggered ES. An example of the WERS includes a voice call service such as a 911 service.

The WEAS is referred to as a Base Station (BS)-triggered Emergency Service (BS-triggered ES), and includes a service supplying an emergency notification to an MS located in a specific geographical location. Examples of the emergency notification include a rainstorm warning, earthquake warning, a tidal storm warning, etc. The WEAS is generally triggered by a BS, which is the reason why the WEAS is referred to as the BS-triggered ES.

The conventional IEEE 802.16 communication system considers providing only the WEAS. The conventional IEEE 802.16 communication system proposes an operational method of a BS broadcasting information in a time duration in which the BS transmits an emergency service message to an MS using a Broadcast Control Pointer Information Element (IE) message included in a DownLink MAP (DL-MAP) message.

Table 1 shows a format of the Broadcast Control Pointer IE message

TABLE 1

| Syntax | Size (bit) | Notes |
|---|---|---|
| Broadcast_Control_Pointer_IE( ) { | — | |
|   Extended DIUC | 4 | Broadcast_Control_Pointer_IE( ) = 0x0A |
|   Length | 4 | Length in bytes |
|   DCD_UCD Transmission Frame | 7 | The least significant bits of the frame number of the next DCD and/or UCD transmission. |
|   Skip Broadcast_System_Update | 1 | — |
|   If (Skip Broadcast_System_Update == 0) | — | — |
|   { | | |
|     Broadcast_System_Update_Type | 1 | Shows the type of Broadcast_System_Update 0: For MOB_NBR-ADV Update 1: For Emergency Services Message |
|     Broadcast_System_Update_Transmission_Frame | 7 | The least significant bits of the frame number of the next Broadcast_System_Update transmission. |
|   } | | |
| } | | |

In Table 1, an Extended Downlink Interval Usage Code (DIUC) represents a code used for identifying an IE message included in a DL-MAP message, a code used for identifying a Broadcast Control Pointer IE message is '0x0A', a Length represents a length of the Broadcast Control Pointer IE message, a Downlink Channel Descriptor (DCD)_Uplink Channel Descriptor (UCD) Transmission Frame is used for representing a frame in which a DCD message and a UCD message are to be transmitted. Here, a value written in the DCD_UCD Transmission Frame represents a Least Significant Bit (LSB) of a frame number in which the next DCD and UCD messages are to be transmitted.

A time duration in which one of a Neighbor Advertisement (MOB_NBR-ADV) message and an emergency message will be transmitted uses the Broadcast Control Pointer IE message. In Table 1, a Skip Broadcast_System_Update represents whether information on the time duration in which one of the MOB_NBR-ADV message and the emergency message will be transmitted is omitted. For example, when a value of the Broadcast_System_Update is '0', the Broadcast_System_Update represents that one of the information on the time duration in which one of the MOB_NBR-ADV message and the emergency message will be transmitted is not omitted.

When the Broadcast_System_Update represents that one of the information on the time duration in which one of the MOB_NBR-ADV message and the emergency message will be transmitted is not omitted, a Broadcast_System_Update_Type and a Broadcast_System_Update_Transmission_Frame are included in the Broadcast Control Pointer IE message. Here, the Broadcast_System_Update_Type represents which one of the MOB_NBR-ADV message and the emergency message will be transmitted, and the Broadcast_System_Update_Transmission_Frame represents a time duration in which a message represented by the Broadcast_System_Update_Type will be transmitted. For example, when a value of the Broadcast_System_Update_Type is '0', the Broadcast_System_Update_Type represents that the MOB_NBR-ADV message will be transmitted, and when a value of the Broadcast_System_Update_Type is '1', the Broadcast_System_Update_Type represents that the emergency message will be transmitted. The Broadcast_System_Update_Transmission_Frame represents an LSB of a frame number in which a message corresponding to a value of the Broadcast_System_Update_Type will be transmitted.

Generally, the Broadcast Control Pointer IE message is used for previously broadcasting a time duration in which a UCD message, a DCD message, a MOB_NBR-ADV message, and an emergency message are transmitted, when an MS in one of an idle mode and a sleep mode is not able to be supplied with a service from a BS in a pre-negotiated period. An MS that receives the Broadcast Control Pointer IE message may receive a corresponding message by waking-up at a start timing point of a corresponding time duration represented by the Broadcast Control Pointer IE message or may restart a service with a BS.

As described above, the conventional IEEE 802.16 communication system only defines an operation in which information on a timing point at which an emergency service message will be transmitted using a Broadcast Control Pointer IE message. That is, the conventional IEEE 802.16 communication system does not consider a specific method for providing an emergency service except for the Broadcast Control Pointer IE message. Thus, there is a need for a method for providing an emergency service in the conventional IEEE 802.16 communication system.

SUMMARY OF THE INVENTION

An aspect of the present invention is to address at least the above-mentioned problems and/or disadvantages and to provide at least the advantages described below. Accordingly, an aspect of the present invention is to provide a system and method for providing an emergency service in a communication system.

In accordance with one aspect of the present invention, a method for providing an emergency service by an idle mode Mobile Station (MS) in a communication system is provided. The method includes receiving, from a Base Station (BS), a broadcast message including information on a time duration in which an emergency service message will be transmitted after waking up at a start timing point of a paging listening interval, transitioning into an idle state when a start timing point of the time duration in which the emergency service message will be transmitted is later than a timing point at which the paging listening interval is terminated, and waking up at the start timing point of the time duration in which the emergency service message will be transmitted after transitioning into the idle state.

In accordance with another aspect of the present invention, a method for providing an emergency service by an idle mode MS in a communication system is provided. The method includes receiving, from a BS, a broadcast message including information on a time duration in which an emergency service message will be transmitted after waking up at a start timing point of a paging listening interval, and maintaining the awake state, thereby waiting for the emergency service message when a start timing point of the time duration at which the emergency service message will be transmitted is later than a timing point at which the paging listening interval is terminated.

In accordance with yet another aspect of the present invention, a method for providing an emergency service by a BS in a communication system is provided. The method includes detecting that there is an emergency service message to be transmitted for an idle mode MS, and broadcasting a broadcast message including information on a time duration in which the emergency service message will be transmitted.

In accordance with still another aspect of the present invention, a method for providing an emergency service in a communication system is provided. The method includes detecting, by a BS, that there is an emergency service message to be transmitted for an idle mode MS, broadcasting, by the BS, a broadcast message including information on a time duration in which the emergency service message will be transmitted, receiving, by the idle mode MS, the broadcast message including the information on the time duration in which the emergency service message will be transmitted, from the BS, after waking up at a start timing point of a paging listening interval, transitioning, by the idle mode MS, into an idle state when a start timing point of the time duration in which the emergency service message will be transmitted is later than a timing point at which the paging listening interval is terminated, and waking up, by the idle mode MS, at the start timing point of the time duration at which the emergency service message will be transmitted after transitioning into the idle state.

In accordance with still another aspect of the present invention, a method for providing an emergency service in a communication system is provided. The method includes detecting, by a BS, that there is an emergency service message to be transmitted for an idle mode MS, broadcasting, by the BS, a broadcast message including information on a time duration in which the emergency service message will be transmitted, receiving, by the idle mode MS, the broadcast message including the information on the time duration in which the emergency service message will be transmitted, from the BS, after waking up at a start timing point of a paging listening interval, and maintaining, by the idle mode MS, the awake state, thereby waiting for the emergency service message when a start timing point of the time duration in which the emergency service message will be transmitted is later than a timing point at which the paging listening interval is terminated.

In accordance with yet another aspect of the present invention, a system for providing an emergency service in a communication system is provided. The system includes a BS, and an idle mode MS for receiving, from the BS, a broadcast message including information on a time duration in which an emergency service message will be transmitted after waking up at a start timing point of a paging listening interval, for transitioning into an idle state when a start timing point of the time duration in which the emergency service message will be transmitted is later than a timing point at which the paging listening interval is terminated, and for waking up at the start timing point of the time duration in which the emergency service message will be transmitted after transitioning into the idle state.

In accordance with yet another aspect of the present invention, a system for providing an emergency service in a communication system is provided. The system includes a BS, and an idle mode MS for receiving, from the BS, a broadcast message including information on a time duration in which an emergency service message will be transmitted after waking up at a start timing point of a paging listening interval, and for maintaining the awake state, thereby waiting for the emergency service message when a start timing point of the time duration in which the emergency service message will be transmitted is later than a timing point in which the paging listening interval is terminated.

In accordance with yet another aspect of the present invention, a system for providing an emergency service in a communication system is provided. The system includes an idle mode MS, and a BS for detecting that there is an emergency service message to be transmitted for the idle mode MS, and for broadcasting a broadcast message including information on a time duration in which the emergency service message will be transmitted.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a system and method for providing an emergency service in a communication system, for example, an Institute of Electrical and Electronics Engineers (IEEE) 802.16 communication system. Here, the IEEE 802.16 communication system is based on an IEEE 802.16 standard. Although a description of exemplary embodiments of the present invention will be given herein with reference to the IEEE 802.16 communication system as an example of the communication system, a system and method for providing an emergency service proposed by the present invention can be used not only in the IEEE 802.16 communication system but also in other communication systems such as a Mobile Worldwide Interoperability for Microwave Access (WiMAX) communication system.

Figure 1:
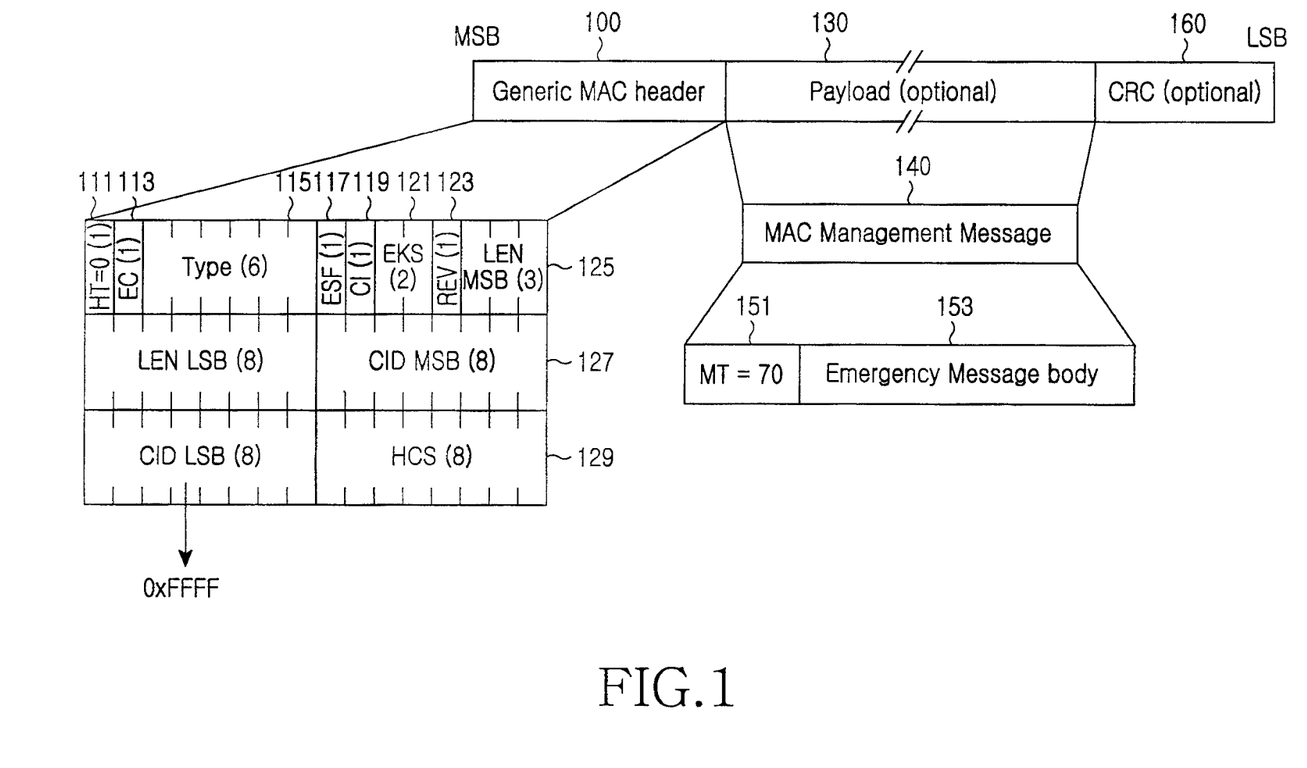
FIG. 1 is a diagram illustrating an emergency service message format of an IEEE 802.16 communication system according to an exemplary embodiment of the present invention.

FIG. 1 is a diagram illustrating an emergency service message format of an IEEE 802.16 communication system according to an exemplary embodiment of the present invention.

Referring to FIG. 1, the emergency service message includes a Generic Medium Access Control (MAC) (Generic MAC) header field 100, a payload field 130, and Cyclic Redundancy Check (CRC) field 160.

The Generic MAC header field 100 includes a Header Type (HT) field 111, an Encryption Control (EC) field 113, a type field 115, an Extended Subheader Field (ESF) 117, a CRC Indicator (CI) field 119, an Encryption Key Sequence (EKS) field 121, a reserved (RSV) field 123, a length (LEN) field 125, a Connection Identifier (CID) field 127, and a Header Check Sequence (HCS) field 129. Each number written in parenthesis of the HT field 111 to the HCS field 129 represents the number of bits used for implementing a corresponding field. For example, the HT field 111 is implemented using 1 bit because "1" is written in parenthesis of the HT field 111.

The HT field 111 represents an HT, the EC field 113 represents whether the payload field 130 is encrypted, the type field 115 represents a type of a subheader included in the emergency service message, the ESF 117 represents whether there is an extended subheader, the CI field 119 represents whether the CRC field 160 is included in the emergency service message, and the EKS field 121 represents an index and an initial vector of a Traffic Encryption Key (TEK) used for encrypting the payload field 130. Here, because it is determined whether the CRC field 160 is included in the emergency service message according to a value written in the CI field 119, a word "optional" is written in the CRC field 160 in FIG. 1.

The RSV field 123 is reserved without a specific use, and the LEN field 125 including a Most Significant Bits (MSB) field and a Least Significant Bits (LSB) field represents a length of the emergency service message. Here, a combination of a value written in the MSB field with a value written in the LSB field represents a length of the emergency service message.

Further, the CID field 127 represents a CID included in the emergency service message. In exemplary embodiments of the present invention, a value of the CID field 127 is written as a broadcast CID because the emergency service message is a message that all Mobile Stations (MSs) may receive. For example, a value of the broadcast CID is '0xFFFF'. That is, because all MSs in a service area of a Base Station (BS) decode a message including a broadcast CID as a MAC management message when the BS of the IEEE 802.16 communication system transmits the message including the broadcast CID, a CID included in an emergency service message which all MSs may receive is a broadcast CID. The HCS field 129 represents an HCS used for detecting an error of the Generic MAC header field 100.

The payload field 130 includes a MAC management message field 140, the MAC management message field 140 includes a management Message Type (MT) field 151, and an emergency message body field 153.

The MT field 151 represents a type of a message being currently transmitted, a MAC message illustrated in FIG. 1 is an emergency service message when a value of the MT field 151 is set to '70'. The emergency message body field 153 represents an Information Element (IE) message included in an emergency service message. For convenience, however, a description of the IE message included in the emergency service message will be omitted herein.

Table 2 shows contents included in the MAC management message field 140.

TABLE 2

| Syntax | Size | Notes |
|---|---|---|
| Emergency Message_Format( ) { | | |
| Management Message Type = 70 | 8 bits | |
| Emergency Message body | Variable | |
| } | | |

When the MSs detect that the received MAC management message is an emergency service message, despite the emergency service message being a MAC management message, the emergency service message is transferred to an upper layer, whereby the emergency service message is processed in the upper layer and not in a MAC layer. Here, a method for transferring the emergency service message to the upper layer may include a method for transferring the emergency service message to the upper layer using a service flow identifier related to the emergency service message. For convenience, however, a description of the method for transferring the emergency service message to the upper layer using the service flow identifier related to the emergency service message will be omitted herein.

In exemplary embodiments of the present invention, the emergency service message is transmitted using the MAC management message including the broadcast CID because all MSs located in a service area of a BS receive the emergency service message and process the emergency service message. Here, all MSs include an MS in a sleep mode, an MS that performs normal operations, and an MS in an idle mode. For convenience, the MS in the sleep mode will be referred to as a 'sleep mode MS', the MS that performs the normal operations will be referred to as a 'normal operation MS', and the MS in the idle mode will be referred to as an 'idle mode MS'.

Operations of an MS in an IEEE 802.16 communication system will be described.

In the IEEE 802.16 communication system, an idle mode MS receives a paging advertisement (MOB_PAG-ADV) message from a BS in a paging listening interval with a preset paging cycle. Here, the MOB_PAG-ADV message is transmitted from a BS to an idle mode MS so that the idle mode MS performs one of a network entry operation and a location update operation.

For example, the BS may control the idle mode MS to perform one of a network entry operation by waking up and a location update operation using the MOB_PAG-ADV message for transmitting downlink data for the idle mode MS when there is downlink data for the idle mode MS.

Further, a start timing point of a paging listening interval for each of idle mode MSs is changed according to a paging period and a paging offset for each of the idle mode MSs. For convenience, however, a description of the paging period, the paging offset, and the paging listening interval for the idle mode MS will be omitted herein.

As described above, because all MSs including a sleep mode MS, a normal operation MS, and an idle mode MS may receive the emergency service message, the emergency service message may be transmitted only one time. Thus, the idle mode MS may wake up at a start timing point of a time duration in which the BS transmits the emergency service message and may wait to receive the emergency service message However, as described above, when there are a plurality of idle mode MSs, timing points of paging listening intervals for the plurality of idle mode MSs may be different from one another. In order to notify idle mode MSs which wake up at different timing points of a timing point at which an emergency service message is broadcast once, the BS may transmit a Broadcast Control Pointer IE messages as many as the number of start timing points of different paging listening intervals. As described in Table 1, the Broadcast Control Pointer IE message includes a plurality of fields, and therefore transmitting the Broadcast Control Pointer IE message results in a waste of resources.

Further, the BS may transmit the emergency service message in a time duration for transmitting the emergency service message, and the time duration may be notified to the idle mode MS from the BS using the Broadcast Control Pointer IE message. For example, because of performing a scheduling operation of the BS, the emergency service message may be transmitted in a time duration, represented by the Broadcast Control Pointer IE message, for transmitting the emergency service message. Here, the time duration, represented by the Broadcast Control Pointer IE message, for transmitting the emergency service message may be one of a frame prior to a frame for transmitting the emergency service message and a frame after the frame for transmitting the emergency service message. In this case, an idle mode MS waking up according to a start timing point of the time duration, represented by the Broadcast Control Pointer IE message, for transmitting the emergency service message does not transmit the emergency service message in a corresponding frame. However, the IEEE 802.16 communication system does not propose an operational method for a case where an idle mode MS does not receive the emergency service message in the time duration, represented by the Broadcast Control Pointer IE message, for transmitting the emergency service message.

Thus, exemplary embodiments of the present invention propose a method in which a BS notifies of a time duration for transmitting an emergency service message of an idle mode MS, and the idle mode MS receives the emergency service message according to the time duration for transmitting the emergency service message.

First, a BS broadcasts a Broadcast Control Pointer IE message in which a value of a Skip Broadcast_System_Update field is set to, for example, '0', a value of a Broadcast_System_Update_Type field is set to, for example, '1', a value of a Broadcast_System_Update_Transmission_Frame field is set to an LSB of a frame number of a frame in which the BS transmits an emergency service message, because the BS notifies of a time duration in which the emergency service message will be transmitted of an idle mode MS. Here, it is represented that information on the time duration in which the emergency service message will be transmitted is not omitted when the value of the Skip Broadcast_System_Update field is set to '0', it is represented that the emergency service message will be transmitted when the value of Broadcast_System_Update_Type field is set to '1', and it is represented that the emergency service message will be transmitted in the frame with the frame number corresponding to the LSB when the value of the Broadcast_System_Update_Transmission_Frame field is set to the LSB.

Based on the above, the BS broadcasts the Broadcast Control Pointer IE message. An operation of an idle mode MS is defined as two operation types below.

The first operation type will be described.

The idle mode MS wakes up at a start timing point of a paging listening interval and receives the Broadcast Control Pointer IE message. The idle mode MS then transitions into an idle state when a start timing point of a frame with a frame number corresponding to an LSB represented by a Broadcast_System_Update_Transmission_Frame field included in the Broadcast Control Pointer IE message is later than a timing point at which the paging listening interval is terminated. The idle mode MS wakes up in the frame with the frame number corresponding to the LSB represented by a Broadcast_System_Update_Transmission_Frame field. An operation of the idle mode MS which wakes up in the frame with the frame number corresponding to the LSB will be described.

First, the idle mode MS may wait until an emergency service message is received after waking up at a start timing point of the frame with the frame number corresponding to the LSB. In this case, the idle mode MS maintains an awake state unless the emergency service message is received.

Second, after waking up at a start timing point of the frame with the frame number corresponding to the LSB, the idle mode MS may transition into an idle state, and may maintain the idle state until the next paging listening interval when the emergency service message is not received during a preset time duration from a timing point at which the idle mode MS woke up.

Third, after waking up at a start timing point of the frame with the frame number corresponding to the LSB, the idle mode MS may transition into an idle state, and may maintain the idle state until the next paging listening interval when the emergency service message is not received, during the frame in which the idle mode MS wakes up.

The second operation type will be described.

The idle mode MS wakes up at a start timing point of a paging listening interval and receives the Broadcast Control Pointer IE message, and maintains an awake state, thereby waiting for the emergency service message, without transitioning into an idle state at a timing point at which the paging listening interval is terminated despite a start timing point of a frame with a frame number corresponding to an LSB represented by a Broadcast_System_Update_Transmission_Frame field included in the Broadcast Control Pointer IE message being later than the timing point at which the paging listening interval is terminated.

In an exemplary embodiment of the present invention, a case where a BS transmits information in a time duration in which the BS transmits an emergency service message to an idle mode MS using a Broadcast Control Pointer IE message, and the emergency service message, was descried. On the other hand, in another exemplary embodiment of the present invention, a BS may transmit an emergency service message to an idle mode MS using a MOB_PAG-ADV message, the another exemplary embodiment of the present invention will be described with reference to FIG. 2.

Figure 2:
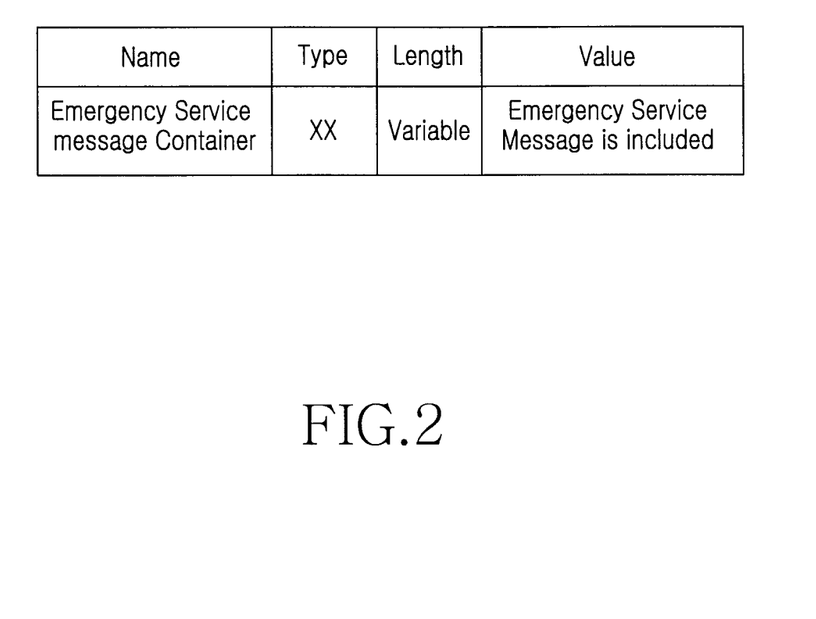
FIG. 2 is a diagram illustrating an emergency service message format of an IEEE 802.16 communication system according to another exemplary embodiment of the present invention.

FIG. 2 is a diagram illustrating an emergency service message format of an IEEE 802.16 communication system according to another exemplary embodiment of the present invention.

An idle mode MS does not have to wake up to receive an emergency service message when a BS transmits a MOB_PAG-ADV message including the emergency service message in a Type, Length, Value (TLV) format because the idle mode MS receives the MOB_PAG-ADV message in a paging listening interval. A power consumption of the idle mode MS may be decreased because the idle mode MS does not have to wake up in order to receive the emergency service message.

Referring to FIG. 2, the emergency service message included in the MOB_PAG-ADV message in the TLV format includes a name field, a type field, a length field, and a value field. Herein, a name of the emergency service message may be set to, for example, 'Emergency Service message Container', a type of the emergency service message may be set to an arbitrary type, a length of the emergency service message may be various, and a value of the emergency service message may be the emergency service message. An idle mode MS may process the received emergency service message by transferring the received emergency service message to an upper layer when the idle mode MS receives the emergency service message illustrated in FIG. 2.

Figure 3:
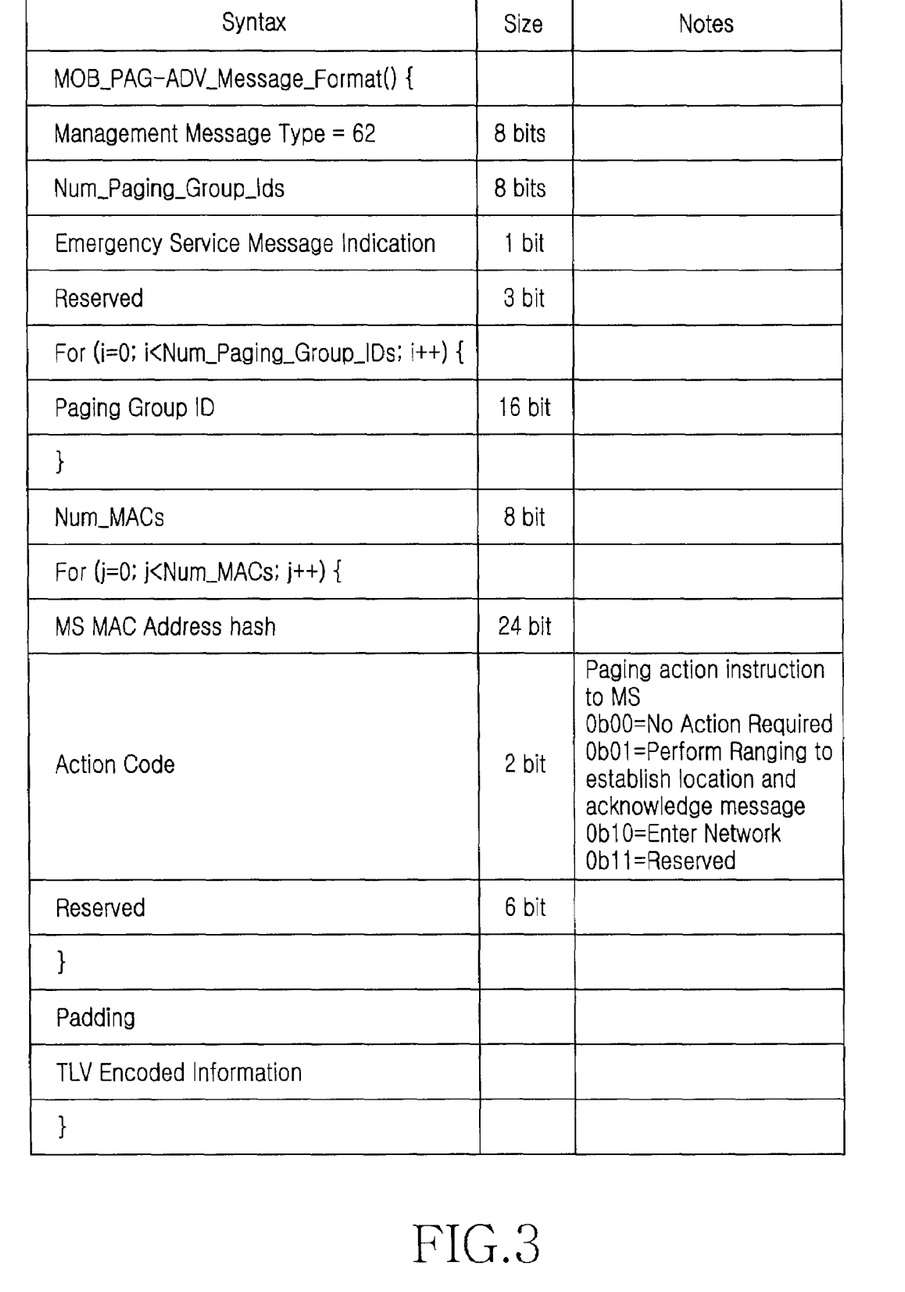
FIG. 3 is a diagram illustrating an emergency service message format of an IEEE 802.16 communication system according to yet another embodiment of the present invention.

FIG. 3 is a diagram illustrating an emergency service message format of an IEEE 802.16 communication system according to yet another exemplary embodiment of the present invention.

As described above, when a BS notifies a time duration in which an emergency service message will be transmitted using a Broadcast Control Pointer IE message, start timing points of paging listening intervals for the plurality of idle mode MSs may be different from one another. Thus, the BS may transmit the Broadcast Control Pointer IE message several times for idle mode MSs of which start timing points of paging listening intervals are different from one another. Here, because a length of the Broadcast Control Pointer IE message is 3 bytes, it results in a waste of resources of the IEEE 802.16 communication system since the BS transmits the Broadcast Control Pointer IE message several times for the idle mode MSs of which the start timing points of paging listening intervals are different from one another. The BS may not be able to transmit the emergency service message in a time duration, for transmitting the emergency service message, represented by the Broadcast Control Pointer IE message.

Thus, in an exemplary embodiment of the present invention, a BS transmits a MOB_PAG-ADV message including indication information that represents whether there is an emergency service message. When the indication information is included in the MOB_PAG-ADV message, an idle mode MS maintains an awake state until the idle mode MS receives the emergency service message despite a paging listening interval being terminated. Further, the idle mode MS transitions into an idle state when the idle mode MS receives the emergency service message in the paging listening interval.

A format of a MOB_PAG-ADV message including an emergency service message is illustrated in FIG. 3, each of elements included in the MOB_PAG-ADV message will be described.

A Paging Group IDentifier (ID) represents a paging group ID of a paging group to which a BS belongs, and is used for location update. An Emergency Service Message Indication represents whether an emergency service message will be transmitted after a frame in which the MOB_PAG-ADV message is transmitted. Here, the Emergency Service Message Indication may be implemented with, for example, 1 bit. Therefore, it may be represented that the emergency service message will be transmitted when a value of 1 bit, for example, is '1', and it is represented that the emergency service message will not be transmitted when a value of 1 bit is, for example, '0'. The idle mode MS maintains an awake state until the emergency service message is received from a timing point at which the MOB_PAG-ADV message is received when the value of the Emergency Service Message Indication is set to '1'. The BS may not be able to transmit the emergency service message. In this case, the BS represents that the emergency service message will not be transmitted using the next MOB_PAG-ADV message, whereby the idle mode MS may transition into an idle state.

Otherwise, an emergency service message may be transmitted in a frame in which the MOB_PAG-ADV message is transmitted. In this case, it is represented that the emergency service message will be transmitted in a frame after the frame in which the MOB_PAG-ADV message is transmitted when the value of the Emergency Service Message Indication is set to '1', and it is represented that the emergency service message will not be transmitted in the next frame after the frame in which the MOB_PAG-ADV message is transmitted when the value of the Emergency Service Message Indication is set to '0'.

An idle mode MS maintains an awake state until the emergency service message is received from a timing point at which the MOB_PAG-ADV message is received when the value of the Emergency Service Message Indication is set to '1'. A BS may not transmit the emergency service message. In this case, the BS represents that the emergency service message will not be transmitted using the MOB_PAG-ADV message, whereby the idle mode MS may transition into an idle state.

Further, an MS MAC Address Hash represents a MAC Address Hash value of an MS controlled by a BS. Here, the BS controls an operation of the MS using a MOB_PAG-ADV message. For example, the MAC Address Hash value may be a residual value, and the residual value may be generated by dividing a MAC Address of a corresponding MS by a preset polynomial. An Action code is used for setting an operation of an MS receiving the MOB_PAG-ADV message. Here, when a value of the Action code is '0b00', it is represented that a corresponding MS does not have to do any action, when the value of the Action code is '0b01', it is represented that a corresponding MS should perform a location update operation, and when the value of the Action code is '0b10', it is represented that a corresponding MS should perform a network entry operation.

Figure 4:
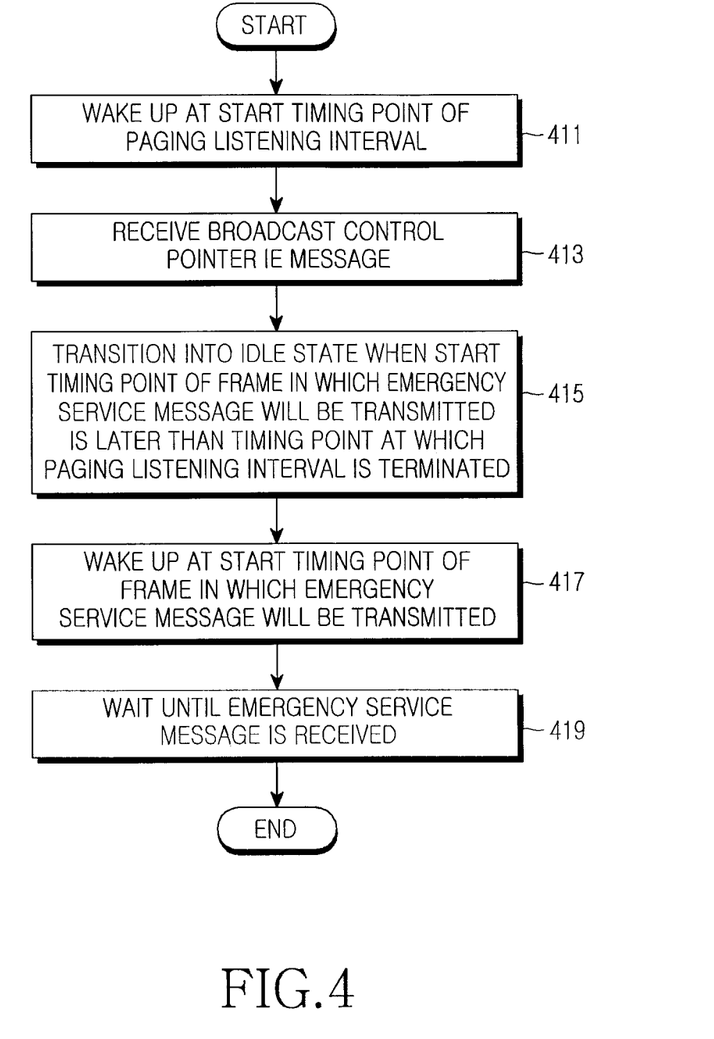
FIG. 4 is a flowchart illustrating operations of an idle mode MS according to an exemplary embodiment of the present invention.

FIG. 4 is a flowchart illustrating operations of an idle mode MS according to an exemplary embodiment of the present invention.

Referring to FIG. 4, in step 411, the idle mode MS wakes up at a start timing point of a paging listening interval. In step 413, the idle mode MS receives, from a BS, a Broadcast Control Pointer IE message. In step 415, the idle mode MS transitions into an idle state when a start timing point of a frame in which an emergency service message will be transmitted is later than a timing point at which the paging listening interval is terminated. Here, the frame in which the emergency service message will be transmitted is a frame with a frame number corresponding to an LSB represented by a Broadcast_System_Update_Transmission_Frame field included in the Broadcast Control Pointer IE message.

In step 417, the idle mode MS wakes up at the start timing point of the frame in which the emergency service message will be transmitted. In step 419, the idle mode MS waits until the emergency service message is received. Here, the idle mode MS maintains the awake state unless the emergency service message is received.

Figure 5:
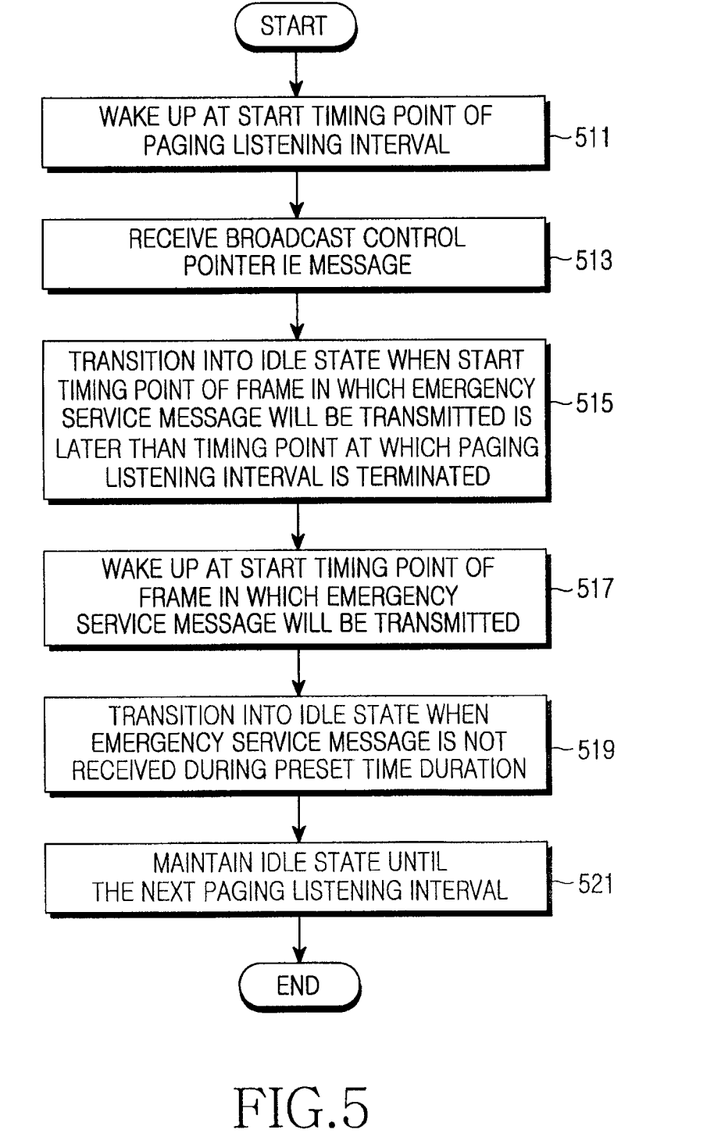
FIG. 5 is a flowchart illustrating operations of an idle mode MS according to another exemplary embodiment of the present invention.

FIG. 5 is a flowchart illustrating operations of an idle mode MS according to another exemplary embodiment of the present invention.

Referring to FIG. 5, in step 511, the idle mode MS wakes up at a start timing point of a paging listening interval. In step 513, the idle mode MS receives, from a BS, a Broadcast Control Pointer IE message. In step 515, the idle mode MS transitions into an idle state when a start timing point of a frame in which an emergency service message will be transmitted is later than a timing point at which the paging listening interval is terminated. Here, the frame in which the emergency service message will be transmitted is a frame with a frame number corresponding to an LSB represented by a Broadcast_System_Update_Transmission_Frame field included in the Broadcast Control Pointer IE message.

In step 517, the idle mode MS wakes up at the start timing point of the frame in which the emergency service message will be transmitted. In step 519, the idle mode MS transitions into the idle state when the emergency service message is not received during a preset time duration. In step 521, the idle mode MS maintains the idle state until the next paging listening interval.

Figure 6:
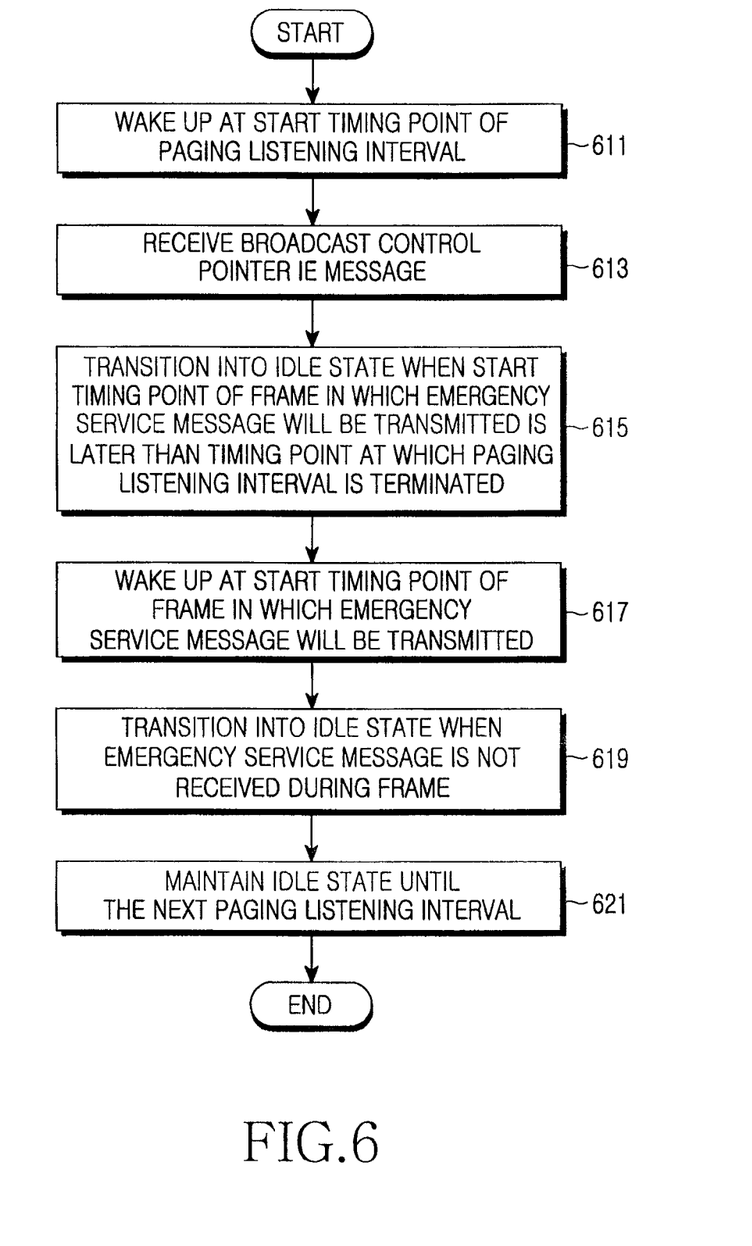
FIG. 6 is a flowchart illustrating operations of an idle mode MS according to yet another exemplary embodiment of the present invention.

FIG. 6 is a flowchart illustrating operations of an idle mode MS according to yet another exemplary embodiment of the present invention.

Referring to FIG. 6, in step 611, the idle mode MS wakes up at a start timing point of a paging listening interval. In step 613, the idle mode MS receives, from a BS, a Broadcast Control Pointer IE message. In step 615, the idle mode MS transitions into an idle state when a start timing point of a frame in which an emergency service message will be transmitted is later than a timing point at which the paging listening interval is terminated. Here, the frame in which the emergency service message will be transmitted is a frame with a frame number corresponding to an LSB represented by a Broadcast_System_Update_Transmission_Frame field included in the Broadcast Control Pointer IE message.

In step 617, the idle mode MS wakes up at the start timing point of the frame in which the emergency service message will be transmitted. In step 619, the idle mode MS transitions into the idle state when the emergency service message is not received during the frame. In step 621, the idle mode MS maintains the idle state until the next paging listening interval.

Figure 7:
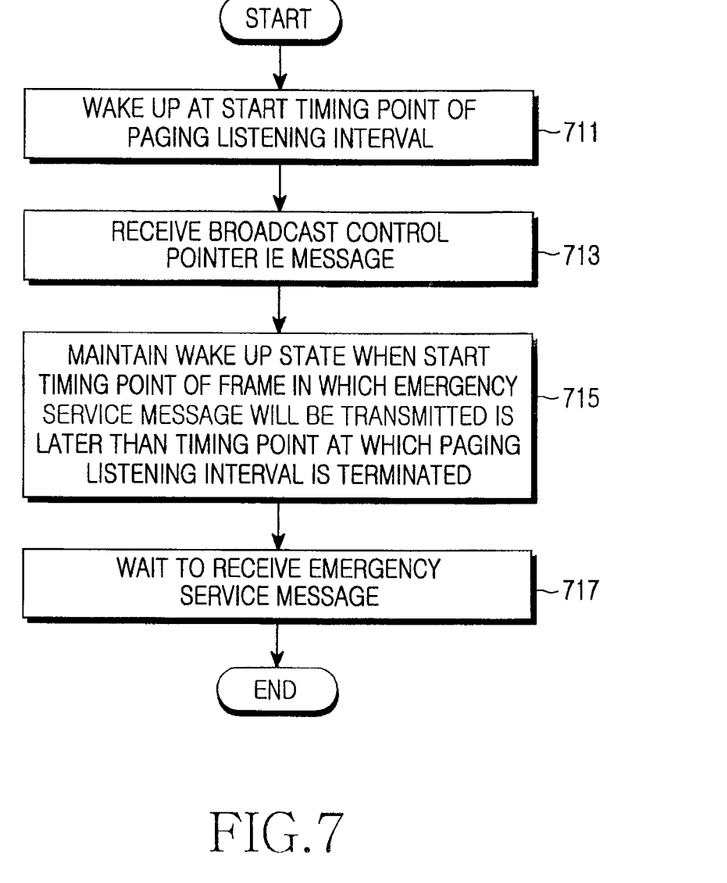
FIG. 7 is a flowchart illustrating operations of an idle mode MS according to a further exemplary embodiment of the present invention.

FIG. 7 is a flowchart illustrating operations of an idle mode MS according to a further exemplary embodiment of the present invention.

Referring to FIG. 7, in step 711, the idle mode MS wakes up at a start timing point of a paging listening interval. In step 713, the idle mode MS receives, from a BS, a Broadcast Control Pointer IE message. In step 715, the idle mode MS does not transition into an idle state, but instead maintains the awake state when a start timing point of a frame in which an emergency service message will be transmitted is later than a timing point at which the paging listening interval is terminated. Here, the frame in which the emergency service message will be transmitted is a frame with a frame number corresponding to an LSB represented by a Broadcast_System_Update_Transmission_Frame field included in the Broadcast Control Pointer IE message. In step 717, the idle mode MS waits to receive the emergency service message.

Figure 8:
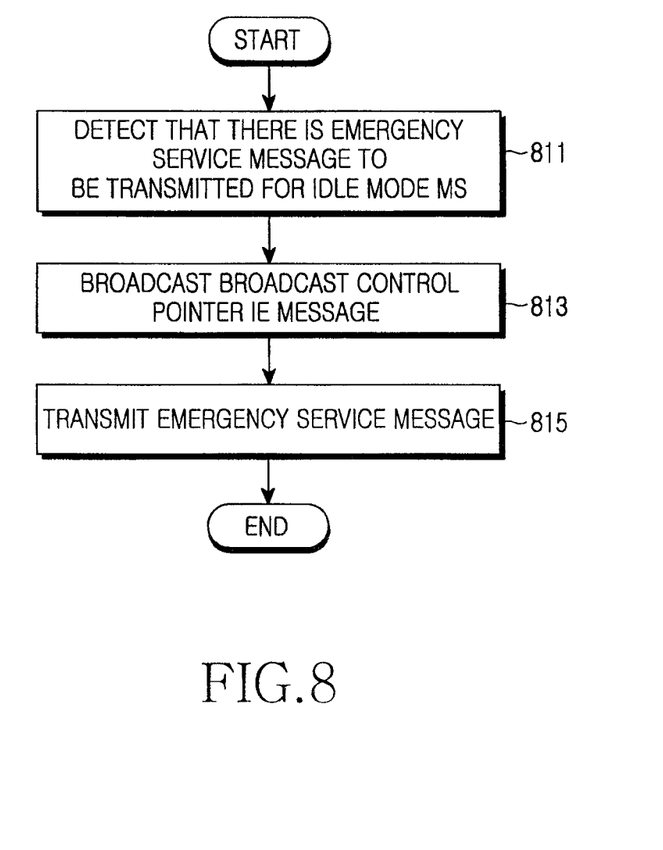
FIG. 8 is a flowchart illustrating operations of a BS according to an exemplary embodiment of the present invention.

FIG. 8 is a flowchart illustrating operations of a BS according to an exemplary embodiment of the present invention.

Referring to FIG. 8, in step 811, the BS detects that there is an emergency service message to be transmitted for an idle mode MS. In step 813, the BS broadcasts a Broadcast Control Pointer IE message. Here, the Broadcast Control Pointer IE message includes a Broadcast_System_Update_Transmission_Frame field, and a frame in which the emergency service message will be transmitted is a frame with a frame number corresponding to an LSB represented by a Broadcast_ System_Update_Transmission_Frame field included in the Broadcast Control Pointer IE message. In step 815, the BS transmits the emergency service message in the frame in which the emergency service message will be transmitted.

Next, yet another example of an operation of an idle mode MS will be described.

Because the idle mode MS maintains an awake state during a paging listening interval, a BS transmits a MOB_PAG-ADV message and an emergency service message in the paging listening interval, whereby the idle mode MS receives the emergency service message. Here, the emergency service message may be an emergency service message including a broadcast CID described above.

Next, yet another example of an operation of an idle mode MS will be described.

First, it will be assumed that a MOB_PAG-ADV message described above includes an LSB of a frame number corresponding to a frame in which an emergency service message will be transmitted. Here, the LSB may be included in the MOB_PAG-ADV message in a TLV format, or may be included in the MOB_PAG-ADV message similar to general parameters.

When the BS transmits the MOB_PAG-ADV message including the LSB, the idle mode MS may accurately detect a timing point at which the emergency service message will be transmitted. In this case, the idle mode MS does not have to maintain the awake state until the emergency service message is received. That is, it is possible that a time during which the idle mode MS maintains the awake state is decreased, thereby decreasing a power consumption for receiving the emergency service message.

As is apparent from the foregoing description, according to exemplary embodiments of the present invention, a communication system, for example, an IEEE 802.16 communication system, may provide an emergency service, thereby enhancing a service performance of the IEEE 802.16 communication system. Further, a BS may accurately notify a time duration in which an emergency service message will be transmitted to an idle mode MS using a Broadcast Control Pointer IE message, whereby the idle mode MS may accurately receive the emergency service message in the time duration in which an emergency service message will be transmitted. In addition, an operational method of an idle mode MS can be accurately provided when the idle mode MS is not able to receive an emergency service message in a time duration in which an emergency service message will be transmitted. Here, a BS notifies the time duration in which the emergency service message will be transmitted to the idle mode MS using a Broadcast Control Pointer IE message.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing an emergency service by an idle mode Mobile Station (MS) in a communication system, the method comprising:

receiving, from a Base Station (BS), a broadcast message including information on a time duration in which an emergency service message will be transmitted after waking up at a start timing point of a paging listening interval;

transitioning into an idle state when a start timing point of the time duration in which the emergency service message will be transmitted is later than a timing point at which the paging listening interval is terminated; and waking up at the start timing point of the time duration in which the emergency service message will be transmitted after transitioning into the idle state, wherein the broadcast message includes a Least Significant Bit (LSB) of a frame number corresponding to a frame in which the emergency service message will be transmitted.

2. The method of claim 1, further comprising:

waiting until the emergency service message is received after waking up at the start timing point of the time duration in which the emergency service message will be transmitted.

3. The method of claim 1, further comprising:

transitioning into the idle state when the emergency service message is not received during a preset time duration after waking up at the start timing point of the time duration at which the emergency service message will be transmitted; and maintaining the idle state until the next paging listening interval after transitioning into the idle state.

4. The method of claim 1, further comprising:

transitioning into the idle state when the emergency service message is not received during the time duration in which the emergency service message will be transmitted after waking up at the start timing point of the time duration at which the emergency service message will be transmitted; and maintaining the idle state until the next paging listening interval after transitioning into the idle state.

5. A method for providing an emergency service by an idle mode Mobile Station (MS) in a communication system, the method comprising:

receiving, from a Base Station (BS), a broadcast message including information on a time duration in which an emergency service message will be transmitted after waking up at a start timing point of a paging listening interval; and maintaining the awake state, thereby waiting for the emergency service message when a start timing point of the time duration at which the emergency service message will be transmitted is later than a timing point at which the paging listening interval is terminated, wherein the broadcast message includes a Least Significant Bit (LSB) of a frame number corresponding to a frame in which the emergency service message will be transmitted.

6. A method for providing an emergency service by a Base Station (BS) in a communication system, the method comprising:

detecting that there is an emergency service message to be transmitted for an idle mode Mobile Station (MS); and broadcasting a broadcast message including information on a time duration in which the emergency service message will be transmitted, wherein the broadcast message includes a Least Significant Bit (LSB) of a frame number corresponding to a frame in which the emergency service message will be transmitted.

7. The method of claim 6, further comprising:

transmitting the emergency service message in the time duration in which the emergency service message will be transmitted.

8. A method for providing an emergency service in a communication system, the method comprising:

detecting, by a Base Station (BS), that there is an emergency service message to be transmitted for an idle mode Mobile Station (MS);

broadcasting, by the BS, a broadcast message including information on a time duration in which the emergency service message will be transmitted;

receiving, by the idle mode MS, the broadcast message including the information on the time duration in which the emergency service message will be transmitted, from the BS, after waking up at a start timing point of a paging listening interval;

transitioning, by the idle mode MS, into an idle state when a start timing point of the time duration in which the emergency service message will be transmitted is later than a timing point at which the paging listening interval is terminated; and waking up, by the idle mode MS, at the start timing point of the time duration at which the emergency service message will be transmitted after transitioning into the idle state, wherein the broadcast message includes a Least Significant Bit (LSB) of a frame number corresponding to a frame in which the emergency service message will be transmitted.

9. The method of claim 8, further comprising:

waiting, by the idle mode MS, until the emergency service message is received after waking up at the start timing point of the time duration in which the emergency service message will be transmitted.

10. The method of claim 8, further comprising:

transitioning, by the idle mode MS, into the idle state when the emergency service message is not received during a preset time duration after waking up at the start timing point of the time duration in which the emergency service message will be transmitted; and maintaining, by the idle mode MS, the idle state until the next paging listening interval after transitioning into the idle state.

11. The method of claim 8, further comprising:

transitioning, by the idle mode MS, into the idle state when the emergency service message is not received during the time duration in which the emergency service message will be transmitted after waking up at the start timing point of the time duration in which the emergency service message will be transmitted; and maintaining, by the idle mode MS, the idle state until the next paging listening interval after transitioning into the idle state.

12. The method of claim 8, further comprising:

transmitting, by the BS, the emergency service message in the time duration in which the emergency service message will be transmitted.

13. A method for providing an emergency service in a communication system, the method comprising:

detecting, by a Base Station (BS), that there is an emergency service message to be transmitted for an idle mode Mobile Station (MS);

broadcasting, by the BS, a broadcast message including information on a time duration in which the emergency service message will be transmitted;

receiving, by the idle mode MS, the broadcast message including the information on the time duration in which the emergency service message will be transmitted, from the BS, after waking up at a start timing point of a paging listening interval; and maintaining, by the idle mode MS, the awake state, thereby waiting for the emergency service message when a start timing point of the time duration in which the emergency service message will be transmitted is later than a timing point at which the paging listening interval is terminated, wherein the broadcast message includes a Least Significant Bit (LSB) of a frame number corresponding to a frame in which the emergency service message will be transmitted.

14. The method of claim 13, further comprising:

transmitting, by the BS, the emergency service message in the time duration in which the emergency service message will be transmitted.

15. A system for providing an emergency service in a communication system, the system comprising:

a Base Station (BS); and an idle mode Mobile Station (MS) for receiving, from the BS, a broadcast message including information on a time duration in which an emergency service message will be transmitted after waking up at a start timing point of a paging listening interval, for transitioning into an idle state when a start timing point of the time duration in which the emergency service message will be transmitted is later than a timing point at which the paging listening interval is terminated, and for waking up at the start timing point of the time duration in which the emergency service message will be transmitted after transitioning into the idle state, wherein the broadcast message includes a Least Significant Bit (LSB) of a frame number corresponding to a frame in which the emergency service message will be transmitted.

16. The system of claim 15, wherein the idle mode MS waits until the emergency service message is received after waking up at the start timing point of the time duration in which the emergency service message will be transmitted.

17. The system of claim 15, wherein the idle mode MS transitions into the idle state when the emergency service message is not received during a preset time duration after waking up at the start timing point of the time duration in which the emergency service message will be transmitted, and maintains the idle state until the next paging listening interval after transitioning into the idle state.

18. The system of claim 15, wherein the idle mode MS transitions into the idle state when the emergency service message is not received during the time duration in which the emergency service message will be transmitted after waking up at the start timing point of the time duration in which the emergency service message will be transmitted, and maintains the idle state until the next paging listening interval after transitioning into the idle state.

19. A system for providing an emergency service in a communication system, the system comprising:
a Base Station (BS); and
an idle mode Mobile Station (MS) for receiving, from the BS, a broadcast message including information on a time duration in which an emergency service message will be transmitted after waking up at a start timing point of a paging listening interval, and for maintaining the awake state, thereby waiting for the emergency service message when a start timing point of the time duration in which the emergency service message will be transmitted is later than a timing point in which the paging listening interval is terminated,
wherein the broadcast message includes a Least Significant Bit (LSB) of a frame number corresponding to a frame in which the emergency service message will be transmitted.

20. A system for providing an emergency service in a communication system, the system comprising:
an idle mode Mobile Station (MS); and
a Base Station (BS) for detecting that there is an emergency service message to be transmitted for the idle mode MS, and for broadcasting a broadcast message including information on a time duration in which the emergency service message will be transmitted,
wherein the broadcast message includes a Least Significant Bit (LSB) of a frame number corresponding to a frame in which the emergency service message will be transmitted.

21. The system of claim 20, wherein the BS transmits the emergency service message in the time duration in which the emergency service message will be transmitted.

22. A system for providing an emergency service in a communication system, the system comprising:
a Base Station (BS) for detecting that there is an emergency service message to be transmitted for an idle mode Mobile Station (MS), and for broadcasting a broadcast message including information on a time duration in which the emergency service message will be transmitted; and
the idle mode MS for receiving, from the BS, the broadcast message including the information on the time duration in which the emergency service message will be transmitted after waking up at a start timing point of a paging listening interval, for transitioning into an idle state when a start timing point of the time duration at which the emergency service message will be transmitted is later than a timing point at which the paging listening interval is terminated, and for waking up at the start timing point of the time duration in which the emergency service message will be transmitted after transitioning into the idle state.

23. The system of claim 22, wherein the idle mode MS waits until the emergency service message is received after waking up at the start timing point of the time duration in which the emergency service message will be transmitted.

24. The system of claim 22, wherein the idle mode MS transitions into the idle state when the emergency service message is not received during a preset time duration after waking up at the start timing point of the time duration in which the emergency service message will be transmitted, and maintains the idle state until the next paging listening interval after transitioning into the idle state.

25. The system of claim 22, wherein the idle mode MS transitions into the idle state when the emergency service message is not received during the time duration in which the emergency service message will be transmitted after waking up at the start timing point of the time duration in which the emergency service message will be transmitted, and maintains the idle state until the next paging listening interval after transitioning into the idle state.

26. The system of claim 22, wherein the BS transmits the emergency service message in the time duration in which the emergency service message will be transmitted.

27. A system for providing an emergency service in a communication system, the system comprising:
a Base Station (BS) for detecting that there is an emergency service message to be transmitted for an idle mode Mobile Station (MS), and for broadcasting a broadcast message including information on a time duration in which the emergency service message will be transmitted; and
the idle mode MS for receiving the broadcast message including the information on the time duration in which the emergency service message will be transmitted after waking up a start timing point of a paging listening interval, and for maintaining the awake state, thereby waiting for the emergency service message when a start timing point of the time duration in which the emergency service message will be transmitted is later than a timing point in which the paging listening interval is terminated.

28. The system of claim 27, wherein the BS transmits the emergency service message in the time duration in which the emergency service message will be transmitted.

* * * * *